March 31, 1953 H. A. GENEST ET AL 2,632,937
MACHINE FOR SHRINKING HAT BATS
Filed Jan. 28, 1949 8 Sheets-Sheet 1

Fig. 1

Inventors
HOMER A. GENEST
WARNER H. GENEST
By Lindsey, Prutzman & Just
Attorneys

March 31, 1953 H. A. GENEST ET AL 2,632,937
MACHINE FOR SHRINKING HAT BATS
Filed Jan. 28, 1949 8 Sheets-Sheet 4

Inventors
HOMER A. GENEST
WARNER H. GENEST
By Lindsey, Prutzman & Just
Attorneys

March 31, 1953 H. A. GENEST ET AL 2,632,937
MACHINE FOR SHRINKING HAT BATS
Filed Jan. 28, 1949 8 Sheets-Sheet 6

Inventors
HOMER A. GENEST
WARNER H. GENEST
By
Lindsey, Prutzman + Just
Attorneys March 31, 1953 H. A. GENEST ET AL 2,632,937
MACHINE FOR SHRINKING HAT BATS
Filed Jan. 28, 1949 8 Sheets-Sheet 8

Inventors
HOMER A. GENEST
WARNER H. GENEST

By
Lindsey, Prutzman + Just
Attorneys

Patented Mar. 31, 1953

2,632,937

UNITED STATES PATENT OFFICE 2,632,937

MACHINE FOR SHRINKING HAT BATS

Homer A. Genest and Warner H. Genest, Danbury, Conn., assignors to United States Hat Machinery Corporation, New York, N. Y., a corporation of Virginia Application January 28, 1949, Serial No. 73,386

22 Claims. (Cl. 28—5)

This invention relates to improvements in machine for shrinking hat bats, such machine being primarily for the purpose of felting, shrinking, and crozing bats from which fur or felt hats are made.

In connection with the existing practice, hat bats are formed of felt in conical shapes, and the bats are then hardened so that they may be handled without disintegrating. The hardened bats are then shrunk and felted by passing the same a number of times through a machine wherein they are maintained in a moistened, heated condition and manipulated in a flat condition. As the bats pass through the machine, the same are crozed, that is, the plies are relatively shifted with respect to one another so as to change the line of crease and thereby avoid streaks and imperfections in the bat.

The bats are repeatedly manually returned to the machine, and between such operations, the operator will successively shift or change the angular positions of the bat so that crozing is successfully effected in different directions through the bat, as explained in Homer A. Genest Patent No. 1,533,351.

By successively passing the bat through the machine in different angular positions, the bat is not only properly crozed incident to being shrunk, but its shape is corrected and maintained. The operator, in manually changing the annular positions of the bats each time they are again fed to the machine, will use such judgment that, when the felting and shrinking operation is completed, the bat will be symmetrical in all respects, that is, it will be of the desired shape, the tip being suitably curved, the side edges bearing the proper angular relation one to another, and the edges of the brim being in registry.

Not only do the bats have their angular positions manually changed each time they are introduced to the machine, but, after a predetermined number of changings of angular position, the bat is completely turned over, that is, turned over either end for end or side for side, and again passed through the machine a number of times, each time changing the angular position, so as to enhance the crozing and felting operations as aforesaid.

It will be seen from the foregoing that all of the feedings, changings of angular position, and turning the bats over are accomplished manually and such operations are therefore costly and time consuming. Further, considerable discomfort is experienced by the operator in performing these functions due to the fact that the bats are continuously saturated by solutions maintained at relatively high temperature approaching the boiling point of water.

It is an object of the present invention to provide, for use with a shrinking machine, means which will automatically feed the bats so as to return them to the entrance of the shrinking machine from the exit thereof, and also automatically change the angular position of the bat prior to each time it is introduced to the entrance of the shrinking machine, thus eliminating a very large amount of the previously required manual operations as well as saving the operator the discomfort referred to above.

It is another object of the invention to provide an improved shrinking machine which will so manipulate the bats during the shrinking and crozing operations that the plies are relatively moved and worked so that the edges or lips of the bats will be in substantial registry with each other when they are ejected from the exit of the machine, whereby the lips will also be in substantial registry when the bat is fed to the entrance of the machine by the aforementioned bat feeding machine, thus insuring maximum beneficial shrinking and crozing without wrinkling.

It is still another object of the invention to provide means, responsive either to time or the passage of a predetermined number of bats, which will function to control the mechanism which changes the angular positions of the bats.

A still further object of the invention is to utilize the aforementioned responsive means, or additional similar means, and a bat ejecting means controlled thereby which will automatically eject the bats from the bat feeding and return device after they have passed through the shrinking machine a predetermined number of times or for a predetermined period of time.

Details of these objects and inventions as well as the other objects thereof are set forth in the following specification and illustrated in the accompanying drawings forming a part thereof.

Shrinking and crozing mechanism

Referring to the drawings, a frame 10 supports the components and sub-structure of a shrinking and crozing machine embodying the principles of the present invention, said machine also felting the bats. Said frame is preferably enclosed by side members 12. The upper portion of the machine, including the rollers and their driving means, are supported by said frame and are described in detail hereinafter. Side covers 14 enclose part of said upper portion of the machine.

Supported by the frame 10 on opposite sides of the machine are a pair of spaced parallel vertical plates 16 and 18 which are provided with a plurality of horizontal opposed openings 20, 22, and 24, the openings 20 and 24 being in the form of vertically disposed slots, whereas the openings 22 are cylindrical. Said openings are for the purpose of positioning bearings 26 within which the opposite ends of roller shafts 28, 30 and 32 are rotatably mounted. Said shafts each support one of the bat-working rollers 34 of which a plurality are provided within the machine.

Figure 2:
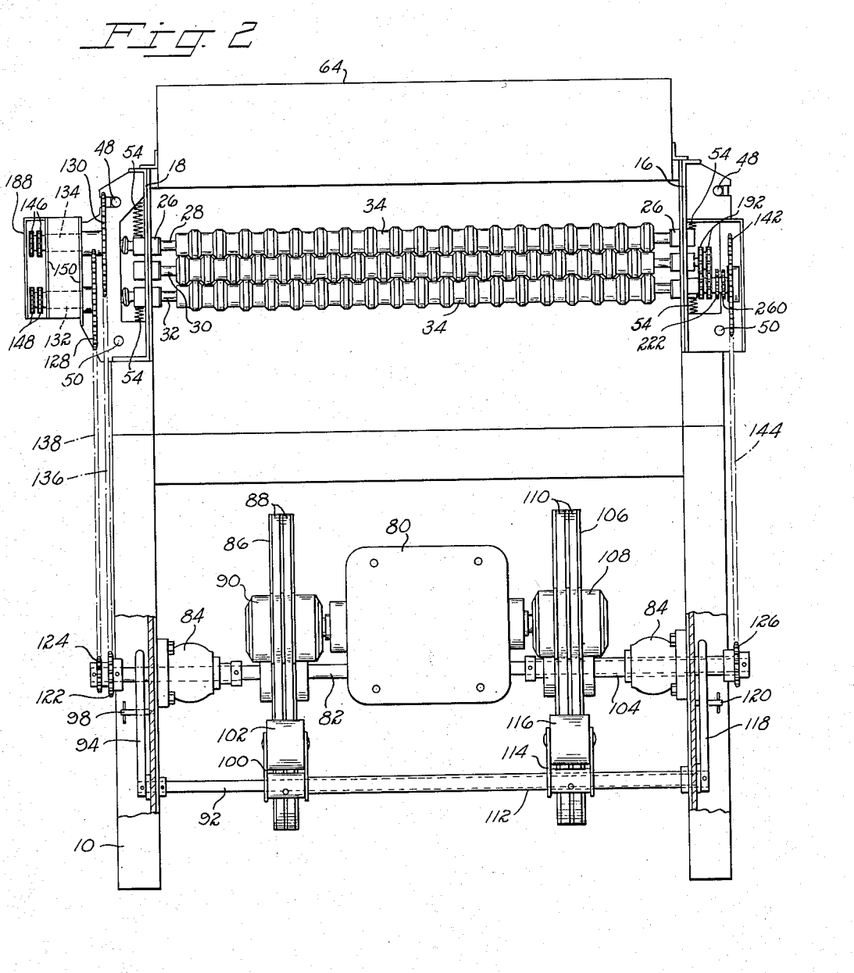
Fig. 2 is an end elevational view, on a larger scale, of the shrinking machine shown in Fig. 1 as viewed from the righthand end of said machine shown in Fig. 1, the bat feeding and positioning device being removed from the machine in Fig. 2.
Figure 4:
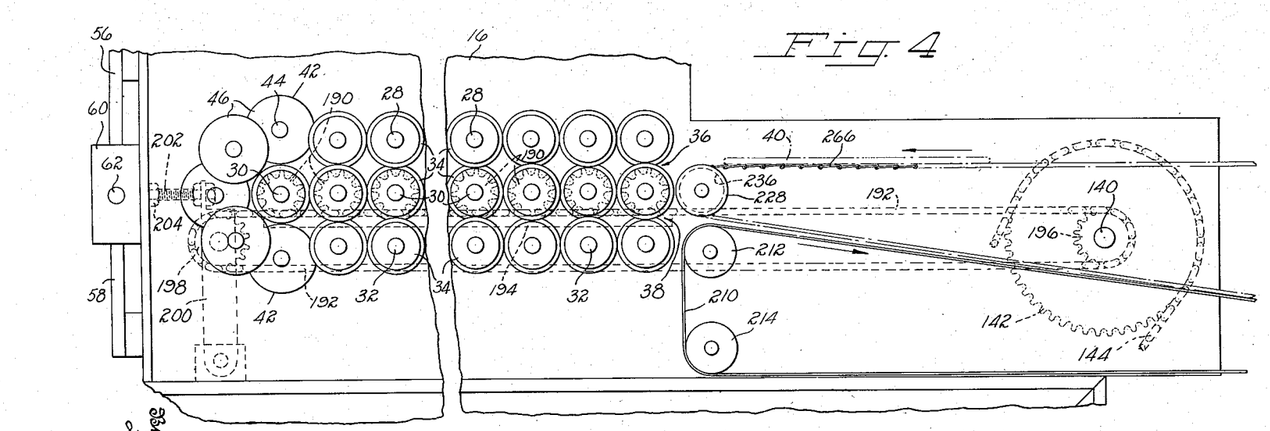
Fig. 4 is an additional fragmentary side elevational view of the shrinking machine shown in Fig. 1 with the parts of the cover removed to illustrate details of other parts of the driving mechanism.
Figure 6:
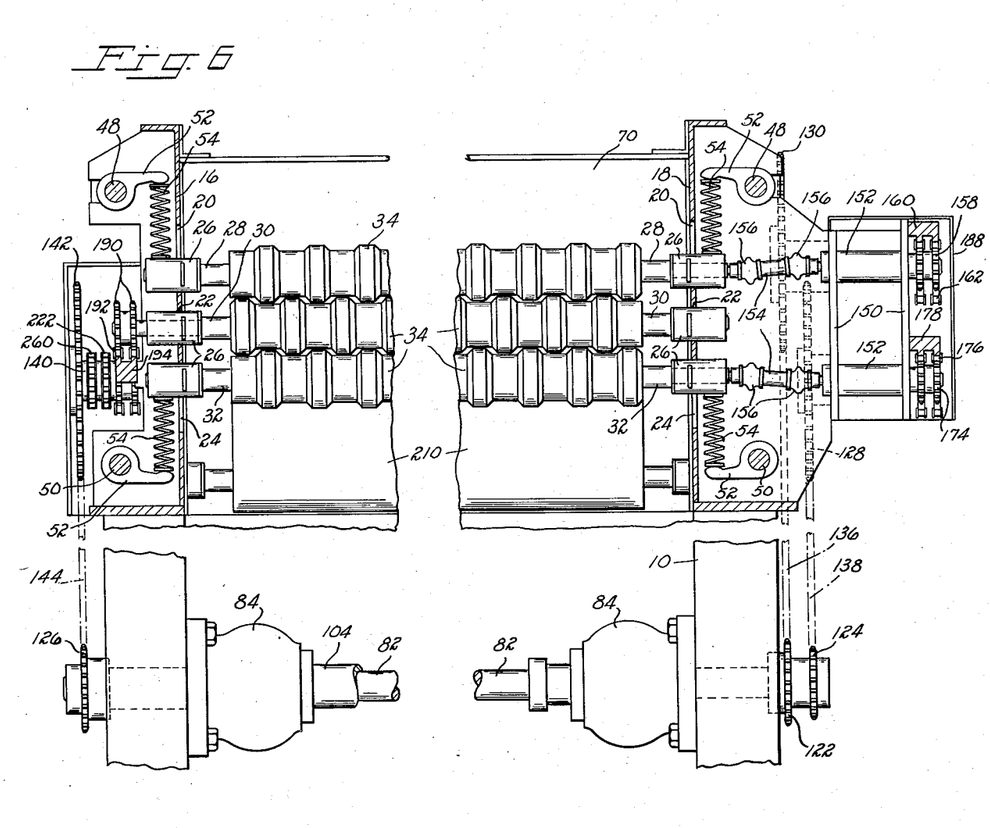
Fig. 6 is a fragmentary vertical sectional view taken on line 6—6 of Fig. 1 and illustrated on the scale of Figs. 3 and 4.

As is clearly shown in Figs. 2, 4, and 6 particularly, there are three superposed horizontally disposed rows of cooperating rollers 34. The intermediate rows of rollers are supported on their shafts 30 within bearings 26 disposed in the parallel rows of cylindrical apertures 22 provided in the opposed plates 16 and 18. Rollers 34 of the upper row are supported on their shafts 28 which are rotatably mounted within the rows of opposed bearings 26 mounted within the vertical slotted openings 20. The intermediate and upper row of rollers 34 co-operate to form therebetween a first passageway, the entrance to said passageway being indicated at 36.

Rollers 34 of the lower row are supported by their shafts 32 which are rotatably mounted in bearings 26 disposed within the rows of slotted openings 24 which are likewise formed in the plates 16 and 18. Said lower row of rollers cooperates with the intermediate row to form a second passageway and the end thereof below the entrance 36 comprises an exit 38. In effect, therefore, the frame and machine have an entrance 36 and exit 38.

Figure 8:
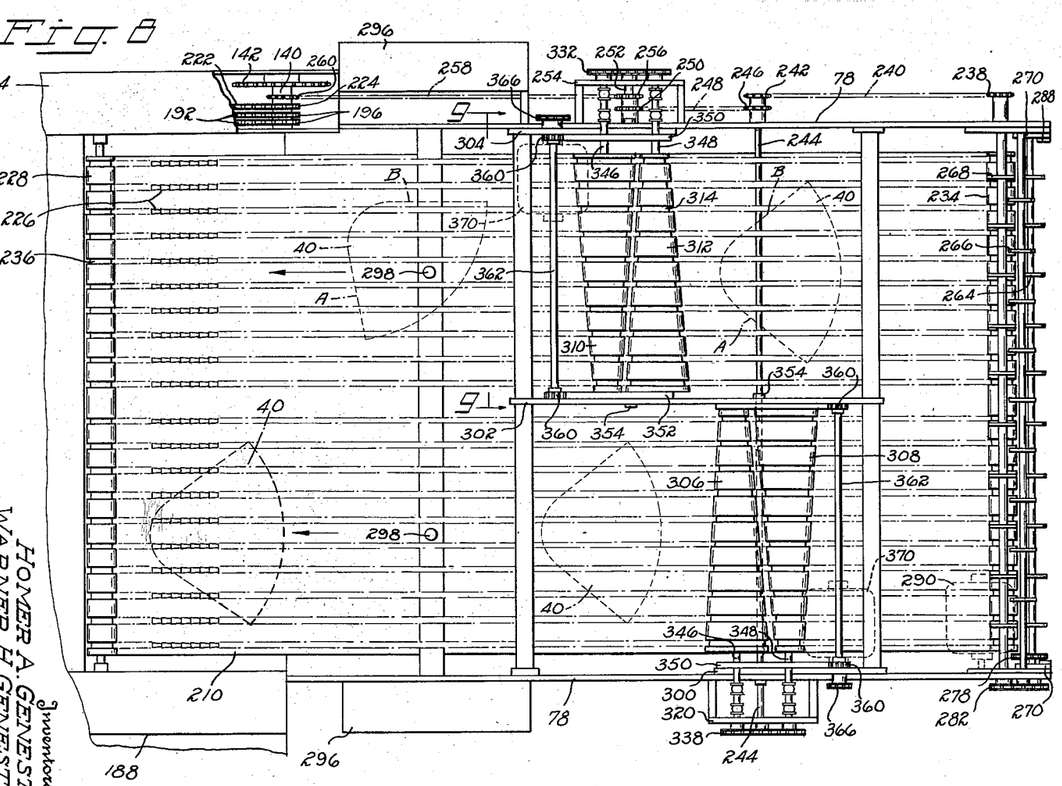
Fig. 8 is a top plan view of that portion of the machine and device shown in Fig. 7, illustrating the manner in which the hat bat feeding and rotating device changes the positions of the bats on the conveyors.

It will be seen that a flat hat bat 40, such as shown in Fig. 8, is fed into the entrance 36 so as to pass between the closely positioned rows of rollers 34 comprising the first passageway and when the bat reaches the lefthand end of the first passageway as viewed in Fig. 4, for example, a plurality of transfer rolls 42 co-operate with the innermost intermediate roller 34 to move the bats from the innermost end of the first passageway into the innermost end of the second passageway, the latter being between the intermediate and lower rows of rollers.

The transfer rollers 42 comprise a plurality of parallel shafts 44 on each of which a plurality of disks 46 are secured in spaced relation to each other. The disks 46 are so spaced on the various shafts 44 that they interfit as shown in Fig. 4. Further, it will be noted that the rollers 34, which perform the felting, shrinking, and crozing functions, are shaped so as to have a series of spaced enlarged portions clearly shown in Figs. 2 and 6 of the drawings. The manner in which these rollers specifically perform these functions is not part of the present invention and for a further understanding of said function attention is directed to Homer A. Genest Patent No. 2,325,909, dated August 3, 1943.

The rollers 34 comprising the intermediate row are mounted for fixed rotation relative to the frame of the machine but the rollers of the upper and lower rows may be moved toward or away from said intermediate row as hat bats are moved through said first and second passageways. The upper and lower rows of rollers are biased toward the intermediate row by mechanism disposed adjacent plates 16 and 18 and comprising a plurality of shafts 48 and 50 to which rocker arms 52 are fixed.

Disposed between the outer ends of the rocker arms and bearings 26 of the upper and lower rows of rollers 34 are helical springs 54 which bias said rows of rollers in the manner described above. Tension on the springs 54 may be increased or decreased by rotating the shafts 48 and 50 in the proper direction to achieve the desired variation in tension. Movement of these shafts is achieved by means of arms 56 and 58 which are secured at one end to the ends of the shafts 48 and 50. Arms 56 and 58 are provided at their other ends with segmental gears, not shown, disposed within housing 60 shown in Fig. 3. A worm 62 is also mounted within said housing so as to engage said segmental gears and, when the worm is rotated, the arms 56 and 58 may be shifted as desired.

The rollers 34 are disposed within a casing supported by the frame 10 and comprising the side plates 16 and 18, a top plate 64 and a tank-like lower member 66 having a sump 68 in the bottom thereof. Said casing encloses a spray chamber 70 within which the bats are thoroughly saturated by a continuous spray passed vertically between the rollers 34 as the bats pass horizontally through said first and second passageways. A sprayer 72 is provided in the upper portion of said chamber 70 and is supplied with spraying solution through a pipe 74 connected with pump 76 mounted within the sump 68 and by which the spraying solution is re-circulated.

Figure 1:
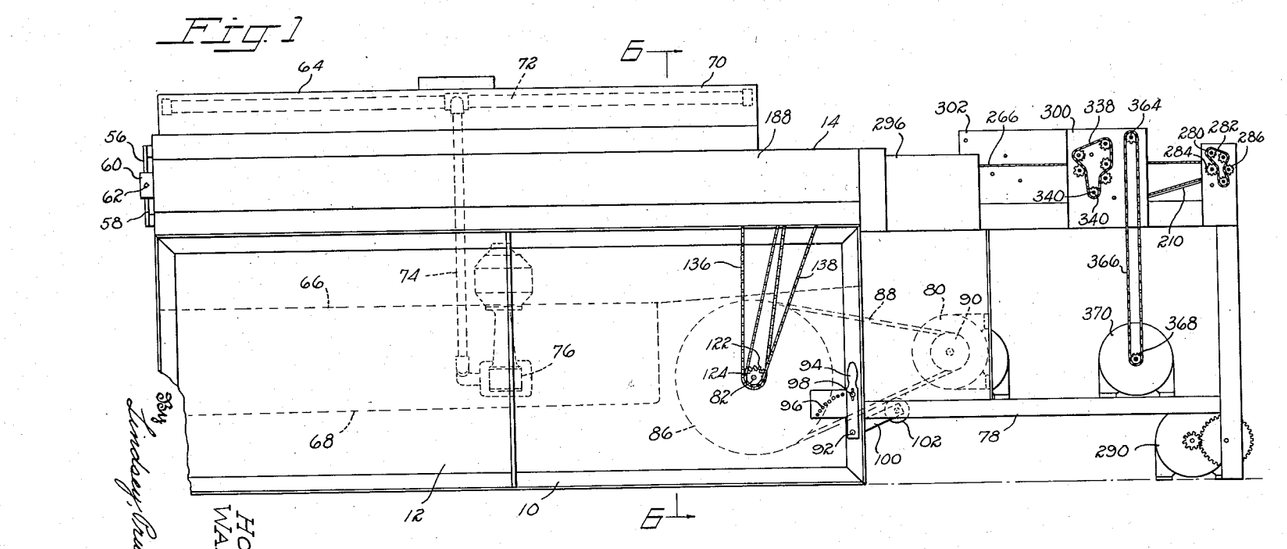
Fig. 1 is a side elevation showing a hat bat shrinking machine embodying the principles of the present invention and also a hat bat feeding and positioning device associated therewith.

A sub-frame 78 is secured to the righthand end of the frame 10 as viewed in Fig. 1, said frame supporting a suitable motor 80. Mounted between the sides of the frame 10 is a shaft 82 supported adjacent its ends within bearings 84. A pulley 86 is fixed to shaft 82 and is driven by one or more belts 88 which, in turn, are driven by a small pulley 90 fixed to the motor shaft. Pulley 90 is horizontally expansible so as to change the effective diameter thereof when desired to vary the speed ratios between said pulley and the pulley 86.

Also mounted between the sides of the frame 10 is another shaft 92 which is parallel to the shaft 82 and is rotatable by means of a handle 94 which may be set in any desired position by means of an arcuate row of indexing apertures 96, said apertures receiving pin 98 carried by handle 94. Fixed to the shaft 92 is an arm unit 100 which supports at the outer end a tensioning roller 102. Pressure of the roller 102 against belt 88 will cause pulley 90 to expand and change the drive ratio in the manner mentioned above.

Mounted upon the shaft 82 is a sleeve 104 which is slidable relative to said shaft. Said sleeve is also rotatably supported by the righthand bearing 84 shown in Fig. 2. Fixed to said sleeve is another pulley 106 similar to pulley 86. Another small pulley 108, corresponding to pulley 90, is mounted on the end of the motor shaft opposite to that which supports pulley 90. Pulleys 106 and 108 are connected by a belt 110. In actual operation, the belts 88 and 110 are preferably V-shaped and, as illustrated in Fig. 2 particularly, a plurality of such belts are used in view of the load imposed upon the motor 80 by the machine.

Pulley 108 is also expansible, like pulley 90, and tensioning means for the belt 108 is provided in the same manner as that for the belt 88. Such tensioning means is operable independently of that for belt 88, however, in that a sleeve 112 is telescopically mounted on shaft 92 but is independently rotatable relative thereto. Said sleeve has an arm unit 114 fixed thereto, said unit supporting rotatable tensioning roller 116. Sleeve 112 is removable by a handle 118 which is fixed thereto and said handle carries a pin 120 which engages one of a plurality of arcuately arranged apertures formed in a part of the frame 10. These apertures are not shown but are similar to the apertures 96 shown in Fig. 1.

From the foregoing it will be seen that shaft 82 may be driven at speeds different from those at which sleeve 104 can be driven, and this is desirable for purposes now to be described. Fixed to the outer end of the shaft 82 are a plurality of sprocket wheels 122—124, said sprocket wheels being a unit and sprocket wheel 124 being smaller than sprocket wheel 122. Fixed to the outer end of sleeve 104 is a single sprocket wheel 126.

Figure 3:
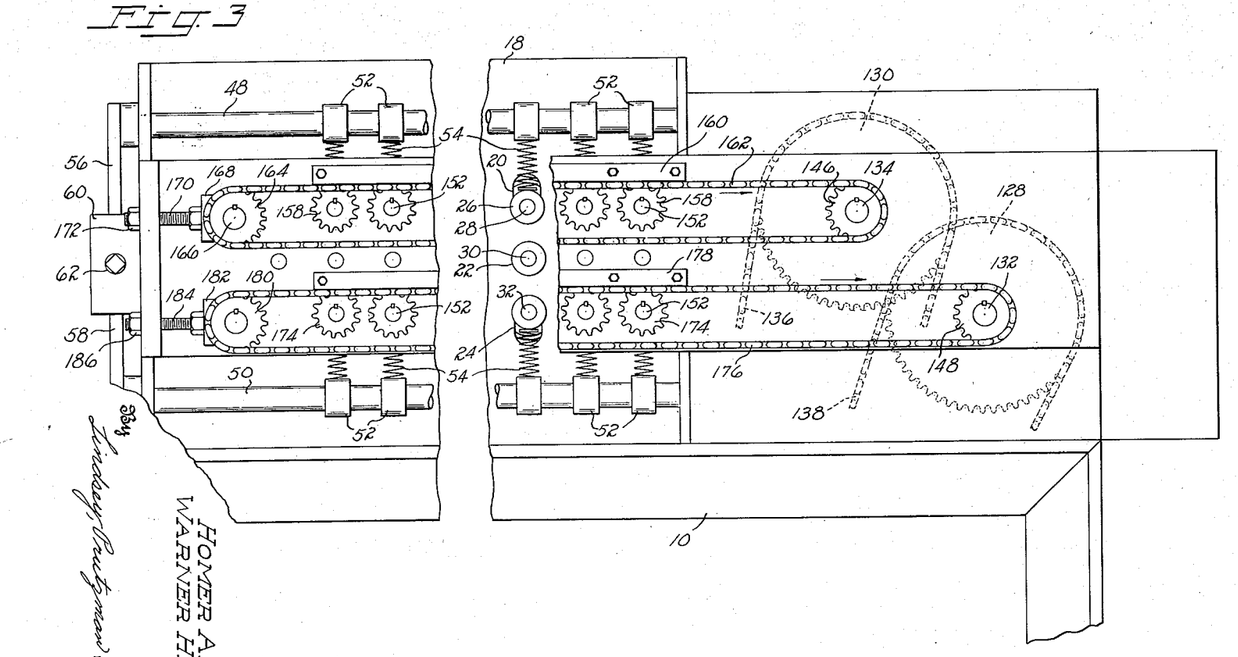
Fig. 3 is a fragmentary enlarged side elevational view of the shrinking machine shown in Fig. 1 with covers removed from the machine to expose the driving means comprising a part of the present invention.

Supported by and at one side of the upper part of the frame 10 are a plurality of large sprocket wheels 128 and 130 which, as can be readily seen from Figs. 2 and 3, are independently mounted on different parallel short shafts 132 and 134. Sprocket wheel 122 is connected with sprocket wheel 130 by a sprocket chain 136 and smaller sprocket wheel 124 is connected with sprocket wheel 128 by another sprocket chain 138.

Mounted on the other side of the machine from sprocket wheels 128 and 130 is another short shaft 140 which has fixed to its outer end another large sprocket wheel 142 which is connected by a sprocket chain 144 to sprocket wheel 126. Due to the different sizes of sprocket wheels 122 and 124, it will be seen that large sprocket wheels 128 and 130 are driven at different speeds. Also, in view of the above described construction which permits different driving speeds between the shaft 82 and the sleeve 104, sprocket wheel 126 may be driven at a different speed from sprocket wheels 122 and 124, whereby large sprocket wheel 142 may be driven at a speed different from the speeds of the large sprocket wheels 128 and 130 for purposes to be described.

Fixed to the outer end of short shaft 134 is a pair of small sprocket wheels 146 which have the same diameter and, fixed to the outer end of the short shaft 132, there is another pair of small sprocket wheels 148 which are of the same diameter and preferably the diameter of sprocket wheels 146.

The short shafts 132 and 134 are supported adjacent their opposite ends by a pair of parallel plates 150 which are fixed to the upper portion of the frame 10. Preferably, suitable bearings are mounted between said shafts and plates. Also mounted between said plates 150 are a plurality of horizontal rows of bearings and short shaft assemblies 152, there being one assembly for each of the roller shafts 28 and 32. The shaft of each assembly 152 is connected to one of the roller shafts 28 or 32 by a short shaft 154 which is connected at its opposite ends to said shaft of assembly 152 and roller shaft by a small universal joint 156. This construction is clearly shown in Fig. 6 and such arrangement readily permits the movement of the roller shafts 28 and 32 away from the intermediate roller shafts 30 under the influence of the bats passing through the first and second passageways referred to above.

Secured to the outer ends of each of the shafts of the upper row of assemblies 152 is a plurality of small sprocket wheels 158 which have the same diameter and, disposed directly above each of said sprocket wheels, is a guide or presser plate 160 which is fixed relative to the upper portion of frame 10. As will be readily seen from Figs. 3 and 6 particularly, the small sprocket wheels 158 are all mounted in a horizontal row and are driven by a pair of sprocket chains 162 which likewise pass around the pair of sprocket wheels 146 on shaft 134. The chains 162 also pass around a pair of sprocket wheels 164 fixed to a suitable shaft 166 adjustably mounted in the lefthand end of the machine, as viewed in Fig. 3, and the chains 162 engage only the upper portions of the small sprocket wheels 158 as is clearly shown in Fig. 3 due to the fact that the sprocket wheels 146 and 164 have larger diameters than sprocket wheels 158. The shaft 166 is mounted in a guided block 168 which may be adjusted longitudinally of the chains 162 by means of threaded rod 170 and nut 172, whereby the tension on the chains 162 may be varied by adjusting the nut 172. Thus, it will be seen that all of the rollers 134 in the upper row which are fixed to roller shafts 28 are unidirectionally driven at the same speed by the arrangement described hereinabove, the same being actuated by sprocket wheel 130, sprocket wheel 122, and shaft 82.

The lower row of rollers 34 which are fixed to roller shafts 32 are likewise unidirectionally driven by an arrangement similar to that just described relative to the upper row of rollers 34. That is, a plurality of small sprocket wheels 174 are fixed to the shafts of lower row of assemblies 152 and said shafts are flexibly connected to the row of roller shafts 32 by short shafts 154 and universal joints 156, clearly shown in Fig. 6. The horizontal row of sprocket wheels 174 are driven by sprocket chains 176 which are maintained in engagement with said sprocket wheels by presser bars 178, said chains being driven by small sprocket wheel 148 and the chains are maintained under tension by another adjustable sprocket wheel 180 supported by a guided block 182 which is adjustable to various positions by a threaded rod 184 and a nut 186. Sprocket wheels 148, as has been mentioned above, are driven by sprocket wheels 124 and shaft 32. Also, as mentioned before, sprocket wheels 122 and 124 are of different diameters and since said sprocket wheels are fixed to rotate in the same rotary path, the lower row of rollers 34 will be driven at a slower speed than the upper row of rollers 34. To add safety to the operation of the machine, the sprocket wheels 158 and 174 and the chains which drive them are preferably enclosed by a suitable cover 188 shown in Fig. 2.

On the side of the machine opposite to that on which the sprocket wheels 158 and 174 are supported, is a row of small sprocket wheels 190 which are secured to the outer ends of the roller shafts 30 which support the intermediate row of rollers 34 of the crozing machine. As with the sprocket wheels 158 and 174, each of the sprocket wheels 190 is double and unidirectionally driven by a pair of sprocket chains 192 which are held in engagement with the sprocket wheels 190 by a plurality of presser bars 194. The chains 192 are driven by a plurality of small sprocket wheels 196 which are fixed to shaft 140 that is driven by large sprocket wheel 142. Another pair of sprocket wheels 198, similar to sprocket wheels 196, are rotatably supported on the upper end of a link unit 200, shown at the lefthand portion of Fig. 4, said link being adjustable about a pivot at its lower end by means of a threaded member 202 which is maintained in suitable adjustment by a nut 204.

As will be seen from Fig. 4, the chains 192 engage only the lower portions of sprocket wheels 190 and since sprocket wheels 196 which drive said chains are driven by sprocket wheel 126, which is secured to sleeve 104, the intermediate row of rollers 34 is generally driven at a speed different from the speeds of the upper and lower rows of rollers 34. For reasons explained above, the speed of the intermediate row of rollers may also be varied due to the expansible pulley 108 on the end of the motor shaft and the mechanism by which said pulley can be expanded.

*Operation of shrinking and crozing mechanism*

In the operation of the mechanism thus far described, flat hat bats are passed into the entrance 36 of the first passageway between the upper and intermediate rows of rollers 34 and the speeds of the three rows of rollers are regulated by varying them with the means hereinabove described so that hat bats are crozed in one direction while passing from said entrance to the lefthand end of the machine as viewed in Fig. 4, at which end they engage the transfer rollers 42.

Figure 5:
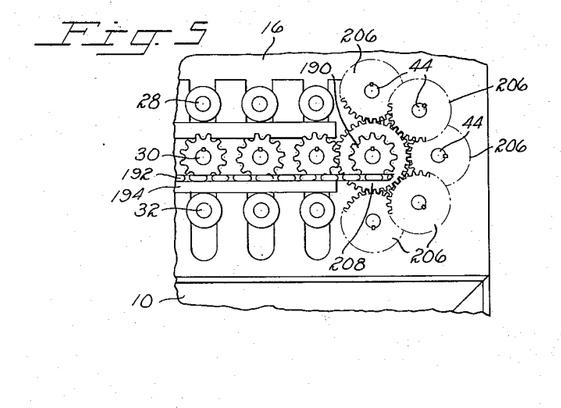
Fig. 5 is a fragmentary side elevational view of part of the roller construction and driving means therefor in the shrinking machine illustrated in Fig. 1 and viewed from the side opposite to that shown in Fig. 1.

It is to be understood that at the time the bats are passed into the entrance 36 the lips or edges thereof are in registry and by the time said bats reach the transfer roller 42, after passing through the first or upper passageway, said edges or lips of the bats have been moved away from each other the maximum amount permissible, without wrinkling the bats. The transfer rollers 42 each have a relatively thin spur gear 206 secured to one end of the shaft 44 of each roller. The inner most shaft 30 of the intermediate rows of crozing rollers also has a spur gear 208 secured to the end thereof adjacent the gears 206 which mesh with spur gear 208. As is seen in Fig. 5, the spur gears 206 mesh with gear 208, whereby all of the gears 206 are unidirectionally driven by the gear 208, the latter being substantially twice as thick as the gears 206 and the latter overlapping each other as shown in Fig. 5. Thus, the transfer rollers 42 rotate unidirectionally to transfer the hat bats 40, which have been crozed to the fullest permissible extent in one direction while moving through the first passageway, to the second passageway which is between the intermediate and lower rows of rollers. While moving through said second passageway the hat bats are crozed in the opposite direction to return the lips or edges thereof to registered condition which registry is achieved at the time the bats emerge from the exit 38 of the second passageway.

In operation, it has been found that the speeds of the three rows of crozing rollers will have to be varied in accordance with the size and thickness of the bats to be crozed. The handles 94 and 118 can be manipulated to regulate the speeds of the rows of rollers 34 in order that the plies of the bats will be relatively moved and the bats crozed the greatest permissible extent, without wrinkling, in one direction by the time they engage the transfer rollers 42 and then be crozed the greatest permissible extent in the opposite direction so that the lips or edges of the bats are returned to registered condition at the time the bats reach the exit 38 of the second passageway.

Thus, double crozing is accomplished while the bats make one complete traverse through the machine. To accomplish this, it has been found that, in general, the ratio of the speeds of rollers of the upper and intermediate rows of rollers is greater than that between the intermediate and lower rows of rollers. As one specific successful operation of the machine with a certain shape and thickness of hat bats, the upper row of rollers were rotated at 118 R. P. M., the intermediate row at 103 R. P. M. and the lower row at 93 R. P. M. This resulted in successful felting and crozing of the hat bats first in one direction and then in the other.

It should be understood that in order to completely felt, shrink and croze a hat it has to be passed through a machine of this nature a substantial number of times. It should also be understood that the foregoing specific recitation of the speed ratios merely represents one example and is not to be considered restrictive of the operation of the machine in that said speeds refer to only one specific batch of bats. Said speeds will have to be varied to suit other bats which are not of the same size, thickness, texture, and the like. However, the speeds of the rollers may be varied to successfully and completely felt, shrink and croze hat bats of a wide range of sizes, thickness, and texture by properly manipulating the adjusting mechanism described above.

Inasmuch as the present machine is operable to croze hat bats in one direction, so that their lips or edges are moved out of registry a maximum permissible amount without wrinkling, and then croze the bats in the opposite direction to bring the lips or edges back into registry by the time they reach the exit 38, it is possible to use in conjunction with the crozing mechanism described above mechanism which will automatically move the hat bats from the exit 38 to the entrance 36 rather than require such return to be manually made as has been necessary heretofore. Such manual return has mainly been previously necessary due to the fact that available machines were not capable of first accurately crozing hat bats from edge registering condition to the greatest permissible amount in one direction and then crozing in the reverse direction to bring the edges back to registry.

Bat feeding and positioning means

Description now follows of the mechanism comprising other parts of the invention by which flat hat bats are moved from the exit 38, automatically angularly shifted by being rotated a desired amount about an axis perpendicular to the planes of the bats, and then automatically returned to the entrance 36 for another passage through the first and second passageways of the crozing machine.

When hat bats are fed to the entrance 36 of the first passageway of the shrinking machine, they are usually introduced tip or point foremost as indicated in Fig. 8. After once traversing the first and second passageways they are introduced with one of the folded edges substantially foremost, in which position the bat has been angularly shifted approximately 45° about an axis vertical to the plane of the bat. After once traversing the two passageways in this position, the bat is next introduced tip foremost again. After once more traversing tip foremost through both passageways, the bat is introduced next with its other folded edge substantially foremost and it traverses said passageways once in this position. During the next traverse, the bat is introduced tip foremost, and so on through the cycle just above described.

When the bats are crozed while going through the passageway tip foremost the bats are subjected to crozing in one direction whereas, when the bats are introduced with one of the folds foremost, crozing is imposed upon the bats in another direction. Thus it is desirable to have the bat traverse the passageways alternately tip first and one of the folds substantially foremost, but it is to be understood that the above specific cycle is merely illustrative and not restrictive.

Heretofore, as mentioned above, such angular shifting of the bats was done manually inasmuch as said bats not only had to be varied in their positions within their own planes but they had to be turned over after every passage or so through the crozing mechanism since the bats would not emerge from the crozing machine with the lips or edges thereof in registry. Actually, when emerging from the usual previously used machines, the plies of the bat had been relatively shifted so that the lips or edges of the bats were spaced from each other in the direction of the plane of the bat the greatest permissible amount since the bats were only crozed in one direction, as distinguished from being crozed also in the reverse direction to return their edges to registry, as is now possible when using the shrinking and crozing mechanism comprising the present invention which accomplishes double crozing during each traverse of the bats through the machine.

After the bats are felted, shrunk and crozed while flat by passing through both the passageways a predetermined number of times, they are then opened and refolded to form a new crease in the bat disposed preferably substantially 90° to the crease the bats had while previously being crozed when the bats are viewed from above when opened in conical form. Such periodic changing of the crease produces more even shrinking of the bats. Such manual manipulation, however, is insignificant compared to the amount of manual operations which are saved by use of the present invention.

Bat feeding means per se

Figure 7:
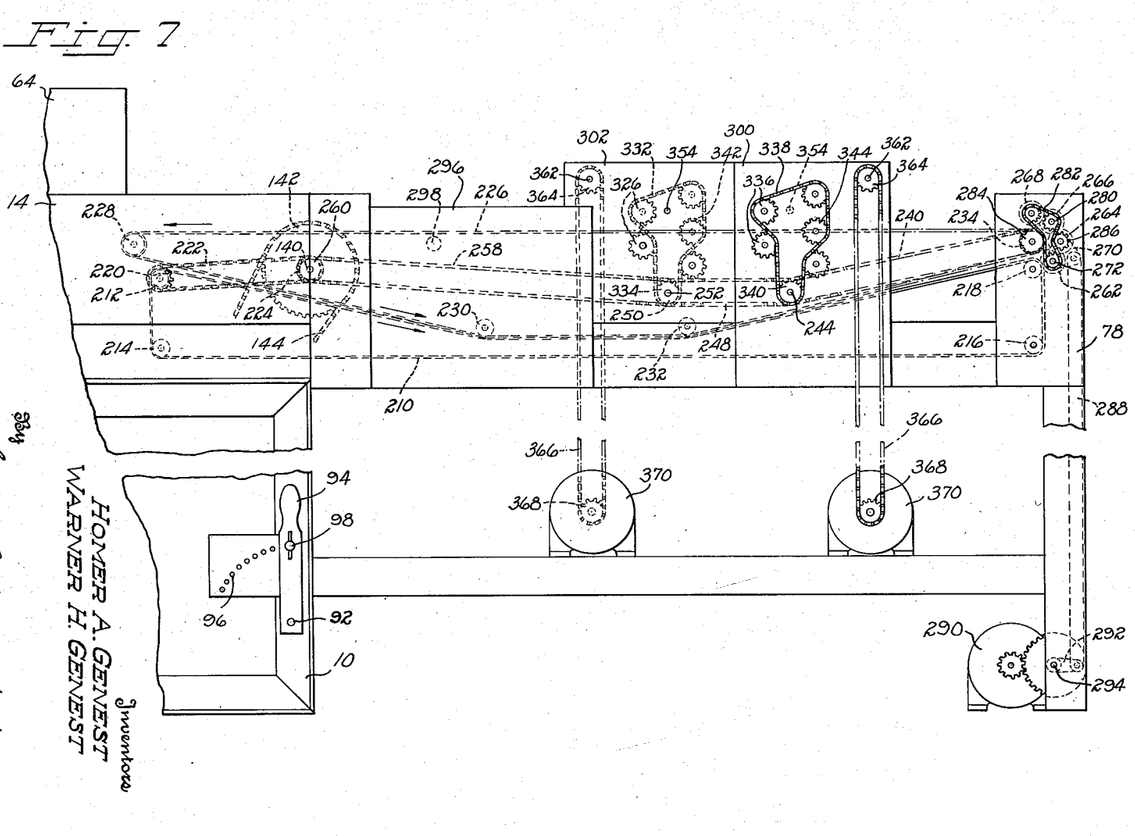
Fig. 7 is a fragmentary side elevation of substantially the righthand half of the combined machine shown in Fig. 1 and illustrating in detail the driving mechanism for the various components of the hat bat feeding and positioning device.

The bat feeding and positioning means is shown as comprising approximately the right-hand third of the machine shown in Fig. 1. Such feeding and positioning means is also shown in side elevation on a larger scale in Fig. 7. The feeding portion of said means primarily comprises a plurality of co-operating conveyor belts which move the bats from the exit to the entrance of the shrinking machine, and means for transferring the bats from one conveyor to the other. Referring particularly to Fig. 7, a supporting conveyor 210, which may be in the form of a flexible relatively wide web or belt extends around rollers 212, 214, 216 and 218. These rollers are mounted on suitable shafts extending between the sides of the sub-frames 78. The shaft to which roll 212 is secured has fixed thereto a small sprocket wheel 220 around which a sprocket chain 222 passes, said chain also passing around another small sprocket wheel 224, fixed to the shaft 140. Thus, sprocket wheel 142 which drives the intermediate row of rollers 34 also drives conveyor 210 by means of sprocket wheel 224.

One end of conveyor 210 is mounted adjacent exit 38 of the second passageway of the crozing mechanism as shown in Fig. 4, whereby said conveyor readily receives bats from said passageway, the lips or edges of the bats being in registry. The bats are then moved, as indicated by arrows in Fig. 4, from said adjacent end of the conveyor 210 to the righthand end of said conveyor shown in Fig. 7. In order to economize in space and accommodate other portions of the bat feeding and rotating mechanism, the conveyor portion which supports the bats first moves downward, then substantially horizontally, and then upward at an angle.

In order that the bats may be maintained properly spaced and positioned upon conveyor 210, another conveyor 226 is suitably supported on rolls 228, 230, 232 and 234. The lower portion of the conveyor 226 is thus guided so as to be juxtaposed to the path of the upper portion of the conveyor 210 and hat bats are held between said juxtaposed portions of the conveyors 210 and 226 while moving toward rolls 218 and 234 of said conveyors. Actually, said lower portion of conveyor 226 controls the shape of the upper portion of conveyor 210, since both portions pass beneath rolls 230 and 232.

For purposes to be described, conveyor 226 preferably consists of a series of horizontally spaced endless chains. One form of chain which is suitable to the present machine is a conventional ladder chain but other suitable types of relative narrow chains, belts, or straps may be used for this purpose. In order that the chain components of the conveyor 226 may be maintained in properly spaced condition, the rolls 228 and 234 are provided with spaced grooves 236 within which the chains are disposed so as to frictionally engage the same. This is so especially in regard to the grooves of roll 234 inasmuch as said roll is positively driven by a sprocket wheel 238 secured to one end thereof, said sprocket wheel being positively driven by a sprocket chain 240. Said sprocket chain also passes around another sprocket wheel 242 which is secured to the outer end of a shaft 244, said shaft passing from one side of sub-frame 78 to the other and being supported within suitable bearings within said frame.

Also fixed to shaft 244 adjacent sprocket wheel 242 is another sprocket wheel 246 which is driven by a sprocket chain 248. Said chain also passes around a sprocket wheel 250 secured to one end of a short horizontally mounted shaft 252 supported at its ends by one side of sub-frame 78 and a parallel auxiliary plate 254 connected to said one side of said sub-frame 78 as clearly shown in Fig. 8.

Fixed to shaft 252 is still another sprocket wheel 256 which is driven by still another sprocket chain 258, the latter being driven by sprocket wheel 260 which is fixed to sprocket wheels 224 and 142. Thus, conveyor 226 is indirectly driven by sprocket wheel 142 which likewise indirectly drives conveyor 210 and the sprockets by which said two conveyors are driven are of such size that said conveyors will move at the same linear speeds.

When hat bats have reached the outer end of the conveyor 210 as it passes around roll 218, the bats are engaged by a transfer mechanism comprising a plurality of interfitting transfer rolls 262, 264, 266 and 268, said rolls resembling the transfer rolls 42 in that they each comprise a series of disks fixed to and longitudinally spaced upon shafts which, with the exception of roll 264, are supported at their ends within suitable bearings in the side members of sub-frame 78. Said transfer rolls, which are shown to advantage in plan view in Fig. 8 and in side elevation in Fig. 7, transfer bats to conveyor 226 and from said conveyor to entrance 36 of the shrinking machine.

Figure 11:
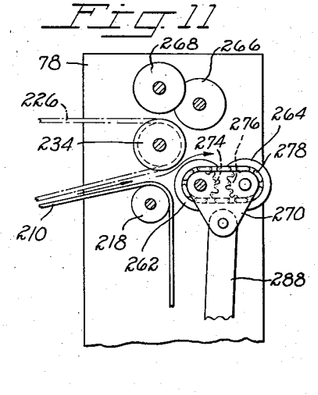
Fig. 11 is a vertical sectional side elevation of a detail of the device shown in Fig. 7 and illustrating the bat feeding mechanism in discharge position.

Transfer roll 264 is supported at its opposite ends in bearings formed in a plurality of members 270 which are disposed adjacent opposite sides of sub-frame 78 as shown in Fig. 8. The members 270 are somewhat triangular in side elevation, as shown in Figs. 7 and 11, and said members are pivoted on a shaft 272 which is the shaft to which the disks comprising transfer roll 262 are fixed. The shaft comprising part of the transfer roll 264 is thus mounted at its ends in members 270 and said shaft is connected to shaft 272 so as to be rotatable thereby, such connection comprising a pair of sprocket wheels 274, 276 and a sprocket chain 278. Transfer rolls 262, 266 and 268 are each provided at one end with sprocket wheels 280 and said sprocket wheels are driven by a sprocket chain 282 which in turn engages sprocket wheel 284 fixed to the same shaft on which sprocket wheel 238 is secured, that is, the shaft which supports grooved conveyor roll 234. Thus, the transfer rolls 262, 266 and 268 are driven by the means which drives conveyor 226 and the engaging surfaces of the disks comprising said transfer rolls preferably move at the same peripheral speed as the linear speed of said conveyor. In order that proper tension may be maintained upon sprocket chain 282, an idler sprocket wheel 286 is mounted on a suitable stub shaft fixed to the upper portion of sub-frame 78.

It will be noted from the foregoing that transfer roll 264 is driven by transfer roll 262 through the medium of sprocket wheels 274 and 276 and sprocket chain 278. The members 270 for supporting transfer roll 264 may be pivotally moved about the axis of the transfer roll and, rather than the transfer roll 264 always being meshed with the other transfer rolls, said roll may be moved to the position shown in Fig. 11 when the members 270 are moved to their position in Fig. 11 by a pair of links 288 which are pivotally connected to the members 270 as clearly shown in Fig. 7. The transfer roll 264, however, is normally maintained in the position shown in Fig. 7 by means of a torque motor 290 which, through suitable gears, actuates a plurality of arms 292 disposed adjacent opposite sides of sub-frame 78 on a shaft 294 which is pivotally supported at its ends within opposite sides of said sub-frame. Each of the gears is connected to one of the links 288. Roll 264 thus functions as a bat ejecting means for the bat feeding means, for purposes now to be described.

At predetermined intervals such as after the passage of a certain interval of time or after a predetermined number of bats have been shrunk and crozed in the manner above described, they must be removed from the entire machine in order that the crease in the bats may be moved or shifted for the reasons and in the manner above described. Accordingly, suitable control mechanism responsive to passage of time or a number of bats is embodied in the bat feeding means so as to control the functioning of said bat ejecting means. Such control means may be mounted, for example, in suitable housings 296, which may be positioned opposite side edges of the conveyor 226 or at any other suitable location. While different satisfactory timing and counting mechanisms are available, a photo-electric cell type of mechanism has been selected for exemplary illustration in the drawings. It will be understood that the circuits for the photo-electric cell mechanism are enclosed within the housings 296. Should timing devices, either mechanical or electrical, or other forms of counting mechanism be used in lieu of said photo-electric cell mechanism, it will be understood that the same will be connected into the circuit of the torque motor 290 so as to control the operation thereof in response to the passage of either time or a predetermined number of bats, depending on the type of control used.

As is evident from Fig. 8, two side-by-side rows of hat bats move along adjacent parallel pathways on the conveyors 210 and 226 as well as through the first and second passageways of the crozing machine. Preferably the bats in the two rows are staggered as shown in Fig. 8. Thus, two photo-electric cells 298 are illustrated in Fig. 8 and each is positioned so as to be responsive to one of the two rows of hat bats moving on said conveyors. The circuit controlling the operation of the torque motor 290 is connected with the photo-electric cell circuit in any suitable way, not shown in detail, and it will be understood that after a predetermined number of hat bats have passed by the photo-electric cells 298, the torque motor 290 will be energized to move in a direction to cause the transfer roll 264 to be moved to the position shown in Fig. 11, whereupon the hat bats will be permitted to move from conveyor 210 to any suitable form of platform or receptacle from which they are taken for purposes of changing the creases therein, as described above.

Following the movement of all bats from the feeding means comprising conveyor 210 and 226, the circuit of the torque motor 290 is energized by the control circuit so as to restore the transfer roll 264 to its position shown in Fig. 7. The number to which the photo-electric or other counting mechanism will be set to be responsive is adjustable and will be the product of the number of bats contained in any one batch or group being crozed multiplied by the number of passes or traverses said group must make through the crozing machine before the bats are to be ejected.

*Bat positioning means per se*

As will be seen from the foregoing, bats are moved on conveyor 210 from the exit 38 to the transfer rolls 262, 264, 266, and 268. Said transfer rolls move the bats from conveyor 210 onto the upper course of the conveyor 226. Said bats are moved by said conveyor to a bat positioning, angular shifting, or rotating means comprising a plurality of pairs of conical rolls illustrated particularly in Figs. 8 and 9. There are two pairs of rolls for half or one pathway of the conveyor 226 and two pairs of rolls for the other half or pathway thereof, as clearly shown in Fig. 8.

Mounted on the upper portion of the subframe 78 are a plurality of vertical and parallel plate-like members 300, 302, and 304. Member 302 is twice as long as members 300 and 304, as shown in Fig. 8. Two vertical pairs of conical rolls 306 and 308 are pivotally supported between plate member 300 and half of plate member 302 while two more pairs of conical rolls 310 and 312 are pivotally supported between plate member 304 and the other half of plate member 302. All of said rolls are provided with concentric spaced grooves 314 through which the spaced chains or other members comprising conveyor 226 may pass.

Each vertical pair of conical rolls is mounted with the small ends thereof juxtaposed and likewise with the larger ends thereof. Thus, as a hat bat passes between a pair of said rolls it will be rotated within its own plane about an axis vertical to the plane a limited amount. The angle at which the rolls illustrated herein diminish from one end toward the other is such that the average size hat bat will be rotated approximately 45° while passing between one pair of them.

Figure 9:
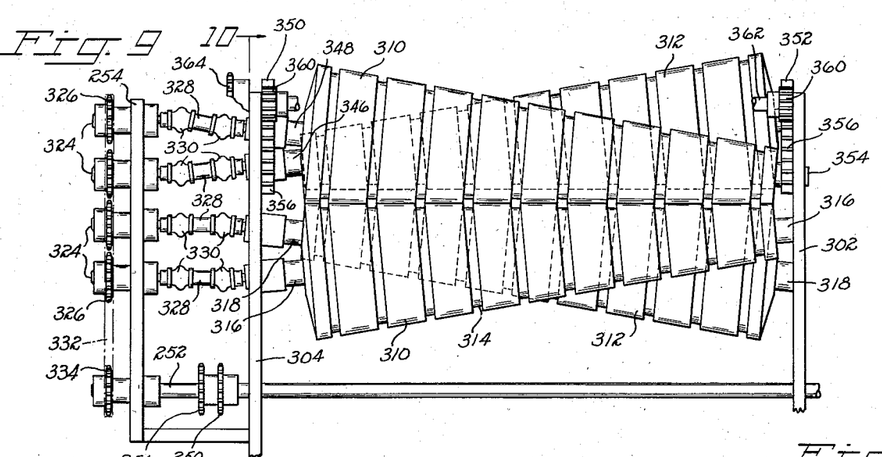
Fig. 9 is a fragmentary vertical elevation taken on line 9—9 of Fig. 8 but illustrated on a larger scale than used in said figure and with the sprockets 326 slightly changed in position and with the idler 342 and its supporting shaft omitted in the interest of clarity.

For convenience, the lower roll of each vertical pair of conical rolls is mounted for rotation about a fixed axis extending at an angle to the horizontal, as is clearly shown from Fig. 9 particularly. Lower rolls 310 and 312, for example, are mounted on shafts 316 and 318 which are positioned in bearings disposed within plates 302 and 304.

Mounted so as to be parallel to plates 300 and 304 is another auxiliary plate 320 which is similar to auxiliary plate 254. In each of said auxiliary plates are a plurality of bearings which support short shafts 324 on the outer ends of each of which are fixed small sprocket wheels 326. Each of the shafts 324 is connected to one of the shafts on which the conical rolls are mounted by means of short intermediate shafts 328 and a pair of universal joints 330 at opposite ends of shafts 328, as clearly shown in Figs. 8 and 9. The use of such universal joints is necessary inasmuch as none of said shafts on which the conical rolls are mounted are parallel to the short shafts 324.

For purposes of simplifying the driving mechanism therefor, all of the pairs of conical rolls are preferably continuously rotated by means of a sprocket chain 332 which passes around the various sprocket wheels 326 at one side of the machine. Said chain is driven by another sprocket wheel 334 secured to shaft 252, see Figs. 7 and 9, and the sprocket wheels 336 on the other side of the machine are interconnected and driven by a sprocket chain 338 which is driven by sprocket wheel 340 fixed to shaft 244. Sprocket wheel 334, being fixed to shaft 252, is driven by sprocket wheel 256, chain 258, and finally large sprocket wheel 142. Since sprocket wheel 250, fixed to shaft 252, also drives shaft 244, it will be seen that sprocket wheel 340 of the other two pairs of conical rolls is also driven by large sprocket wheel 142.

As will be readily seen from Fig. 7 particularly, the sprocket chains 332 and 338 are disposed relatively to the sprocket wheels 326 and 336 in such a way that the individual rolls of each vertical pair will travel in opposite rotary directions. To facilitate such interconnection of the sprocket wheels 326 and 336 by the sprocket chains 332 and 338, idler sprocket wheels 342 and 344 are mounted so as to be engaged by said chains, said idlers being supported respectively by auxiliary plates 320 and 254.

As has been stated above, the lower roll of each vertical pair of conical rolls is preferably rotatably mounted about a fixed axis but the upper roll of each pair is mounted so as to be movable toward and away from the lower roll of said pair while maintaining the juxtaposed surfaces of the two rolls substantially parallel, as is clearly shown in Fig. 9, wherein the nearest pair of rolls are shown in engagement, but the pair of rolls to the rear thereof are shown out of engagement and spaced sufficiently far apart that a bat may pass therebetween without being engaged by said rearward pair of rolls.

This condition exists relative to each set of two pairs of rolls mounted respectively adjacent opposite side edges of the conveyor 226. To accomplish such relative movement between the rolls of each vertical pair, the shafts 346 and 348 on which the two upper rolls of each pair are mounted are supported at their ends in spaced rockable plates 350 and 352, each of said plates being movable about a pivot 354 supported by the plates 300, 302 and 304.

Figure 10:
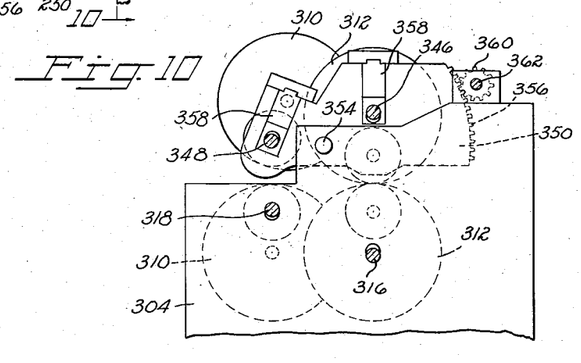
Fig. 10 is a fragmentary vertical elevation taken on line 10—10 of Fig. 9.

Each plate is also provided with a segmental gear portion 356 having its center at the pivot 354. Further, the shafts 346 and 348 of each set of two pairs of conical rolls are mounted so as to be yieldable relative to said rockable plates 350 as is shown in Fig. 10. Such yieldable mounting can comprise any suitable means 358 which will permit controlled movement of the upper roll away from the lower roll when said rolls are in engagement as shown in the foremost pair of rolls illustrated in Fig. 9.

The rockable plates 350 are shifted by means of small pinion gears 360 which are supported by suitable shafts 362 in plates 300, 302, and 304. Also secured to the outer end of each stub shaft 362 is a sprocket gear 364 which is driven by a sprocket chain 366 and another sprocket gear 368. The sprocket gears 368 are each driven by an individual torque motor 370. Said motors are controlled by a circuit which is interconnected in the aforementioned control circuit which is subject to the influence of the counting mechanism 296.

Assuming a hat bat 40 is moving point or tip foremost as shown at the right in the upper path illustrated in Fig. 8, the leading pair of rolls, that is, those nearest to the oncoming hat bat, are disposed in engagement with each other while the remote or trailing pair are disposed out of engagement with each other. The hat bat will be engaged and rotated by said leading set of rolls so as to dispose the bat as shown at the left in said upper path illustrated in Fig. 8. The bat will then be carried by conveyor 226 to entrance 36. Said bat will then be disposed with crease A approximately foremost and will pass through the crozing machine disposed in this position.

The next time said bat encounters the conical shifting or positioning rolls, it should be rotated back to the position it originally had so that it will next pass through the crozing machine point or tip foremost. To accomplish this, the remote or trailing set of conical rolls should be in engagement and the nearest set out of engagement.

When said bat next encounters the positioning rolls, it should be rotated so that crease B will be foremost and to accomplish this the trailing set of rolls will remain in contact while the nearest set again stay out of contact.

The bat, on successive traversings should be first rotated in reverse directions so as to be tip foremost for one passage through the crozing machine and then, on the next passage therethrough, turned further in the same rotary direction so that crease A will be foremost which is illustrated at the left in the upper path in Fig. 8. Such two last mentioned turnings are accomplished successively by the nearest pair of rolls being in contact while the trailing pair are out of contact. It will thus be seen that the nearest set of rolls are in engagement while a batch of bats pass therethrough twice, the trailing or remote set of rolls being out of engagement, and the trailing set are then brought into engagement and the nearest move out of engagement, during which time the batch of bats passes therethrough twice, and this cycle is repeated until the batch has been crozed the desired amount.

Assuming, for example, that there are sixteen bats to a batch, eight bats will pass along each path on the conveyor 226 and through the first and second passageways in the crozing machine. If the bats are first fed into the shrinking machine point or tip foremost, the counting or timing means will be set so that the leading rolls 312 are in engagement and trailing rolls 310 are out of engagement long enough to permit eight bats to pass through rolls 312 and be angularly shifted thereby clockwise, as viewed in Fig. 8, to dispose folded edge A substantially foremost. This is the limit of such clockwise angular shifting of the bats.

The counting or timing means will then cause the leading rolls 312 to be moved out of engagement and the trailing rolls 310 to be moved into engagement until each of the eight bats has passed through rolls 310 twice, or long enough for sixteen bats to pass between the rolls 310. The engagement of the bats by rolls 310 the first time they pass therethrough will angularly shift the bats counter-clockwise relative to Fig. 8 to dispose the points or tips foremost. The second engagement of the bats with rolls 310 will cause them to be further angularly shifted counter-clockwise so that folded edge B is substantially foremost. This is the limit of such counter-clockwise angular shifting of the bat.

The counting or timing mechanism will then move trailing rolls 310 out of engagement and return leading rolls 312 to engagement, maintaining them so until sixteen bats have passed therebetween, that is, until each bat of the eight in the path has passed through the rolls twice; first, to angularly shift the bats clockwise to dispose the points or tips foremost and, secondly, to further shift the bats clockwise to dispose them with folded edge A foremost.

The counting or timing mechanism then moves leading rolls 312 out of engagement and trailing rolls 310 into engagement for the purposes above described, and so on, through this cycle until the bats have passed through the shrinking machine the desired number of traverses to complete the shrinking and crozing thereof. Generally, the last traverse of the bats is made with the points or tips foremost. Thus, the last set of rolls engaged by the bats will remain in engagement while the eight bats pass therebetween only once as with the rolls first engaged by the bats at the commencement of the angular shifting operations described above.

Thus, the counting or timing mechanism is capable of controlling the circuits of motors 370 and 290 so that, for example, the batch of bats in each path passes through one pair of conical rolls once, then alternately through each pair of rolls twice for a predetermined number of times, then through one pair of the rolls once, and then out of the machine over bat ejecting roller 264.

The two sets of the two pairs of conical rolls are longitudinally spaced relative to the conveyor at different positions, as shown in Fig. 8, primarily for purposes of simplifying the mounting thereof. Further, the movement of the upper rolls of each set by means of rockable plates 350 and 352 is positive, without disturbing the driving connections of said rolls due to the flexible portions of said drive means comprising universal joints 330 and intermediate shafts 328. The movement of only one roll of each pair relative to the other should not be considered restrictive, however, since it is conceivable that both rolls of each pair may be mounted so as to be movable in opposite directions away from or toward each other by suitable mechanism not illustrated herein.

It will thus be seen that the bat feeding and angular shifting mechanism described in the foregoing is operable to alternately feed the bats to the entrance 36 tip foremost or with one of the folds A or B foremost, the sequence preferably being tip foremost, fold A or B foremost, tip foremost, the other fold foremost, tip foremost, etc. This is possible by passing each bat through one pair of conical rolls of each set twice and then shifting the rolls of each set in the manner described above. After the bats have been shrunk and crozed the desired amount, they are automatically ejected from the crozing and feeding mechanism by the movement of the transfer roll 264 to the position shown in Fig. 11, following which said bats may be manually crozed by being opened and having their creases shifted 90° or so in the manner above described. This latter function is manual but, as stated hereinbefore, is only a small manual function as compared to all the manual functions required in the existing practice.

While the invention has been illustrated and described in its several preferred embodiments and has included certain details, it should be understood that the invention is not limited to the precise details herein illustrated and described, since the same may be carried out in other ways, falling within the scope of the invention as claimed.

We claim as our invention:

1. A machine for shrinking hat bats comprising in combination, a frame having an entrance and exit, three rows of co-operating rollers rotatably supported by said frame in superposed relation so as to provide between the intermediate row and one of the other rows a first passageway to pass flattened hat bats into said machine from the entrance thereof and also provide between the intermediate row and the other row a second passageway to pass said bats out of said machine through the exit thereof, transfer means to move said bats from the first passageway to the second pasageway, and adjustable means to drive said rows of rollers at different pre-selected speeds, the ratio of speeds being greater between the rows of rollers forming said first passageway than between those forming the second passageway, whereby flattened hat bats can be fed into said entrance with their rim edges substantially evenly registered and the plies of the bats relatively moved in one direction within said first passageway to move said rim edges away from each other and the plies relatively moved in the opposite direction within said second passageway to move the rim edges back into substantially even registry when they reach the exit of said machine.

2. A machine for shrinking hat bats comprising in combination, a frame having an entrance and exit, three rows of co-operating rollers rotatably supported by said frame in superposed relation so as to provide between the intermediate row and one of the other rows a first passageway to pass flattened hat bats into said machine from the entrance thereof and also provide between the intermediate row and the other row a second passageway to pass said bats out of said machine through the exit thereof, transfer means to move said bats from the first passageway to the second passageway, adjustable means to drive said rows of rollers at different preselected speeds, the ratio of speeds being greater between the rows of rollers forming said first passageway than between those forming the second passageway, whereby flattened hat bats can be fed into said entrance with their rim edges substantially evenly registered and the plies of the bats relatively moved in one direction within said first passageway to move said rim edges away from each other and the plies relatively moved in the opposite direction within said second passageway to move the rim edges back into substantially even registry when they reach the exit of said machine, and feeding and positioning means automatically operable to feed said bats from said exit to said entrance of said machine in predetermined position within a plane in which they are fed to said entrance.

3. A machine for shrinking hat bats comprising in combination, means having an entrance and an exit, a plurality of rollers within said means arranged to receive from said entrance a flattened hat bat having its rim edges substantially evenly registered with each other, means to operate certain of said rollers at different speeds to manipulate said bat so that the plies thereof are first crozed to work the rim edges away from each other and then back into substantially even registration incident to the bat reaching the exit of said machine, a bat feeding means adjacent said exit operable to receive said bat from said exit and move it to said entrance, and means associated with said feeding means and operable to automatically shift the angular position of said bat a limited amount about an axis normal to the plane of the flattened bat prior to the bat being fed by said feeding means to said entrance.

4. A machine for shrinking hat bats comprising in combination, means having an entrance and an exit, a plurality of rollers within said means arranged to receive from said entrance a flattened hat bat having it rim edges substantially evenly registered with each other, means to operate certain of said rollers at different speeds to manipulate said bat so that the plies thereof are first crozed to work the rim edges away from each other and then back into substantially even registration incident to the bat reaching the exit of said machine, a bat feeding means adjacent said exit operable to receive said bat from said exit and move it to said entrance, and means associated with said feeding means and selectively operable to automatically shift the angular position of said bat a limited amount in either direction about an axis normal to the plane of the flattened bat prior to the bat being fed by said feeding means to said entrance.

5. A machine for shrinking hat bats comprising in combination, means having an entrance and an exit, a plurality of rollers within said means arranged to receive from said entrance a flattened hat bat having its rim edges substantially evenly registered with each other, means to operate certain of said rollers at different speeds to manipulate said bat so that the plies thereof are first crozed to work the rim edges away from each other and then back into substantially even registration incident to the bat reaching the exit of said machine, a bat feeding means adjacent said exit operable to receive said bat from said exit and move it to said entrance, and means associated with said feeding means and automatically selectively operable after the passage of a predetermined number of bats to automatically shift the angular position of said bat a limited amount in either direction about an axis normal to the plane of the flattened bat prior to the bat being fed by said feeding means to said entrance.

6. A machine for shrinking hat bats comprising in combination means having an entrance and an exit, a plurality of rollers within said means arranged to receive from said entrance a flattened hat bat having its rim edges substantially evenly registered with each other, means to operate certain of said rollers at different speeds to manipulate said bat so that the plies thereof are first crozed to work the rim edges away from each other and then back into substantially even registration incident to the bat reaching the exit of said machine, bat positioning means comprising a pair of conical rolls operable to receive a flattened bat and shift the angular position of it a predetermined amount within its plane as it passes between said rolls, and a bat feeding means adjacent said exit operable to receive said bat therefrom and move it to said bat positioning means and thence to said entrance.

7. A machine for shrinking hat bats comprising in combination, means having an entrance and an exit, a plurality of rollers within said means arranged to receive from said entrance a flattened hat bat having its rim edges substantially evenly registered with each other, means to operate certain of said rollers at different speeds to manipulate said bat so that the plies thereof are first crozed to work the rim edges away from each other and then back into substantially even registration incident to the bat reaching the exit of said machine, bat positioning means comprising a plurality of pairs of conical rolls rotatably mounted with their axes disposed transversely to the path of movement of a bat emerging from said exit, the small ends of one pair of rolls extending toward one side of said path and the small ends of the other pair extending toward the other side of said path, means operable to selectively and alternatively move said pairs of rolls into and out of operative position to receive a bat and alternatively shift the angular position thereof in opposite directions in accordance with which pair of rolls is in operative position, and bat feeding means disposed adjacent said exit and operable to receive a bat therefrom and move it to said bat positioning means and thence to said entrance.

8. A machine for shrinking hat bats comprising in combination, means having an entrance and an exit, a plurality of rollers within said means arranged to receive from said entrance a flattened hat bat having its rim edges substantially evenly registered with each other, means to operate certain of said rollers at different speeds to manipulate said bat so that the plies thereof are first crozed to work the rim edges away from each other and then back into substantially even registration incident to the bat reaching the exit of said machine, bat positioning means comprising a plurality of pairs of conical rolls rotatably mounted with their axes disposed transversely to the path of movement of a bat emerging from said exit, the small ends of one pair of rolls extending toward one side of said path and the small ends of the other pair extending towards the other side of said path control means arranged to operate said pairs of rolls to selectively and alternatively move the pairs into and out of operative position to receive a bat and alternatively shift the angular position thereof in opposite directions in accordance with which pair of rolls is in operative position, only one pair of said rolls being in operative position at any one time, and bat feeding means disposed adjacent said exit and operable to receive a bat therefrom and move it to said bat positioning means and thence to said entrance.

9. A machine for shrinking hat bats comprising in combination, means having an entrance and an exit, a plurality of rollers within said means arranged to receive from said entrance a flattened hat bat having its rim edges substantially evenly registered with each other, means to operate certain of said rollers at different speeds to manipulate said bat so that the plies thereof are first crozed to work the rim edges away from each other and then back into substantially even registration incident to the bat reaching the exit of said machine, bat positioning means comprising a plurality of pairs of conical rolls rotatably mounted with their axes disposed transversely to the path of movement of a bat emerging from said exit, the small ends of one pair of rolls extending toward one side of said path and the small ends of the other pair extending towards the other side of said path, means responsive to the passage of a predetermined number of bats arranged to operate said pairs of rolls to selectively and alternatively move the pairs into and out of operative position to receive a bat and alternatively shift the angular position thereof in opposite directions in accordance with which pair of rolls is in operative position, only one pair of rolls being in operative position at any one time, and bat feeding means disposed adjacent said exit and operable to receive a bat therefrom and move it to said bat positioning means and thence to said entrance.

10. A machine for shrinking hat bats comprising in combination, means having an entrance and an exit, a plurality of rollers within said means arranged to receive from said entrance flat hat bats having their rim edges substantially evenly registered with each other, means to operate certain of said rollers at different speeds to manipulate said bats so that the plies thereof are first crozed to work the rim edges away from each other and then back into substantially even registration incident to the bats reaching the exit of said machine, a bat feeding means adjacent said exit operable to receive bats from said exit and move them to said entrance, means associated with said feeding means and operable to automatically shift the angular positions of said bats a limited amount about an axis normal to the plane of the flat bats prior to the bats being fed by said feeding means to said entrance, and means responsive to the passage of a predetermined number of bats associated with said bat feeding means and operable to automatically eject said bats from said feeding means after a batch of bats have passed through said shrinking machine a predetermined number of times.

11. For use with a hat bat shrinking machine having an exit and an entrance, bat feeding and shifting means comprising in combination, a conveyor system having ends positionable adjacent the exit and entrance of a bat shrinking machine, and bat shifting means associated with said conveyor system intermediate the ends thereof and automatically operable to engage flat bats on said conveyor and angularly shift said bats a limited amount within their own planes upon said conveyor.

12. For use with a hat bat shrinking machine having an exit and an entrance, bat feeding and shifting means comprising in combination, a first conveyor positionable adjacent the exit of a bat shrinking machine, a second conveyor positionable adjacent the entrance of said bat shrinking machine, bat shifting means associated with said second conveyor and automatically operable to receive flat bats and shift the angular position of them within their own plane to a predetermined position on said second conveyor, and transfer means associated with said conveyors and operable to transfer bats from the first conveyor to the second.

13. For use with a hat bat shrinking machine having an exit and an entrance, bat feeding and shifting means comprising in combination, a first conveyor positionable adjacent the exit of a bat shrinking machine, a second conveyor positionable adjacent the entrance of said bat shrinking machine, bat shifting means associated with said second conveyor and operable to receive flat bats and shift the angular position of them within their own plane to a predetermined position on said second conveyor, transfer means associated with said conveyors, and operating mechanism for said transfer means operable in response to the passage of bats on one of said conveyors and settable to transfer a predetermined number of bats from said first to said second conveyor means and then become inoperative, whereby bats are thereafter ejected from said conveyor.

14. For use with a hat bat shrinking machine, bat shifting means comprising in combination, transfer mechanism positionable to receive flat bats from said shrinking machine, and means positioned relative to said transfer mechanism and operable to receive flat bats from said transfer mechanism and angularly shift said bats a predetermined amount within their own plane.

15. For use with a hat bat shrinking machine, bat shifting means comprising in combination, transfer mechanism positionable to receive flat bats from said shrinking machine, means positioned to receive flat bats from said transfer mechanism and selectively operable to angularly shift said bats a predetermined amount within their own planes in either rotary direction about an axis vertical to said flat bats, and control means operable at predetermined intervals to control the angular shifting means for selecting the direction in which said bats will be shifted.

16. For use with a hat bat shrinking machine, bat shifting means comprising in combination, transfer mechanism positionable to receive flat bats from said shrinking machine, means positioned to receive flat bats from said transfer mechanism and selectively operable to angularly shift said bats a predetermined amount within their own planes in either rotary direction about an axis vertical to said flat bats, and control means responsive to the passage of a predetermined number of bats relative to said bat shifting means and operable to control the angular shifting means for selecting the direction in which said bats will be shifted.

17. For use with a hat bat shrinking machine, a bat shifting mechanism comprising in combination, a conveyor positionable to receive flat hat bats from a bat shrinking machine, a pair of conical rolls rotatably mounted on opposite sides of said conveyor with the axes thereof transverse to the path of movement of the conveyor, the small ends of both of said rolls being disposed adjacent one edge of a pathway for bats upon said conveyor and the large ends adjacent the other edge of said pathway, and means to drive said rolls in opposite rotary directions to receive therebetween from said conveyor flat hat bats and angularly shift said bats a limited amount within their planes incident to passing between said rolls and discharge said angularly shifted bats onto said conveyor for return thereby to said shrinking machine.

18. For use with a hat bat shrinking machine, a bat shifting mechanism comprising in combination, a conveyor positionable to receive flat hat bats from a bat shrinking machine, a pair of conical rolls rotatably mounted on opposite sides of said conveyor with the axes thereof transverse to the path of movement of the conveyor, the small ends of both of said rolls being disposed adjacent one edge of a pathway for bats upon said conveyor and the large ends adjacent the other edge of said pathway, means to drive said rolls in opposite rotary directions to receive therebetween from said conveyor flat hat bats and angularly shift said bats a limited amount within their planes incident to passing between said rolls and discharge said angularly shifted bats onto said conveyor for return thereby to said shrinking machine, means operable to move one of said rolls away from and toward its operative positions relative to the other roll, and means controlling the operation of said roll moving means in response to the passage of a predetermined number of bats relative to said rolls.

19. For use with a hat bat shrinking machine, a bat shifting mechanism comprising in combination, an endless conveyor positionable to receive flat hat bats from a bat shrinking machine and comprising a plurality of spaced relatively narrow belt-like members, means to support said conveyor for longitudinal movement, a pair of annularly grooved conical rolls rotatably mounted on opposite sides of a portion of the path of said conveyor with the axes thereof transverse to said path of the conveyor and the grooves thereof receiving said spaced members thereof, the small ends of both said rolls being disposed adjacent one edge of a pathway for bats upon said conveyor and the large ends adjacent the other edge of said pathway, and means to drive said rolls in opposite rotary directions to receive therebetween flat hat bats moved thereto by said conveyor and shift the angular position of said bats a limited amount within their planes incident to their passing between said rolls, said shifted bats passing from between said rolls onto said conveyor for return thereby to said bat shrinking machine.

20. For use with a hat bat shrinking machine, a bat shifting mechanism comprising in combination, a conveyor positionable to receive flat hat bats from a bat shrinking machine, two pairs of conical rolls, the rolls of each pair being respectively rotatably mounted on opposite sides of said conveyor with the axes of the rolls transverse to the path of movement of the conveyor and the small ends of both rolls of one pair being disposed adjacent one edge of a pathway for bats upon said conveyor and the small ends of both rolls of the other pair being disposed adjacent the other edge of said pathway, means to drive said rolls of each pair in opposite rotary directions to receive therebetween from said conveyor flat hat bats and shift the angular position of said bats a limited amount within their planes incident to their passing between said rolls and discharge said angularly shifted bats onto said conveyor for return thereby to said shrinking machine, and means to alternately move said pairs of rolls from their operative position relative to said conveyor, whereby only one pair of rolls is operable at any one time to angularly shift said bats and the pairs of rolls serving respectively to angularly shift said bats in opposite directions.

21. For use with a hat bat shrinking machine, a bat shifting mechanism comprising in combination, a conveyor positionable to receive flat hat bats from a bat shrinking machine, two pairs of conical rolls, the rolls of each pair being respectively rotatably mounted on opposite sides of said conveyor with the axes of the rolls transverse to the path of movement of the conveyor and the small ends of both rolls of one pair being disposed adjacent one edge of a pathway for bats upon said conveyor and the small ends of both rolls of the other pair being disposed adjacent the other edge of said pathway, means to drive said rolls of each pair in opposite rotary directions to receive therebetween from said conveyor flat hat bats and angularly shift said bats a limited amount within their planes incident to passing between said rolls and discharge said angularly shifted bats onto said conveyor for return thereby to said shrinking machine, means operable to alternately move said pairs of rolls from their operative positions relative to said conveyor, whereby only one pair of rolls is operable at any one time to angularly shift said bats, and the pairs of rolls serving respectively to angularly shift said bats in opposite directions, and settable means operable in response to the passage of a predetermined number of bats on said conveyor to actuate said roll moving means.

22. A machine for automatically shrinking and crozing hat bats comprising in combination hat manipulative means defining a passageway having an entrance and an exit, said manipulative means being arranged to manipulate under pressure the flattened bats as they pass therebetween in order to felt and shrink the bats, means for operating said manipulative means to croze the bats successively in opposite directions as they go through said passageway whereby the plies of the bats as they issue from the exit are substantially in the same registry as when fed into the entrance, bat conveying means operable to receive the bats from the exit and return them to said entrance, and means associated with said conveying means and operable to automatically shift the angular position of the bats a limited amount about an axis normal to the planes of the flattened bats prior to the bats being returned by said conveying means to said entrance.

HOMER A. GENEST.
WARNER H. GENEST.

REFERENCES CITED

The following references are of record in the file of this patent:

UNITED STATES PATENTS

| Number | Name | Date |
|---|---|---|
| 2,169,372 | Pecker | Aug. 15, 1939 |
| 2,203,409 | Franz | Jan. 4, 1940 |
| 2,288,572 | Reynolds | June 30, 1942 |
| 2,325,909 | Genest | Aug. 3, 1943 |

FOREIGN PATENTS

| Number | Country | Date |
|---|---|---|
| 558,265 | Germany | Sept. 5, 1932 |